United States Patent [19]
Fleischaker

[11] 3,800,459
[45] Apr. 2, 1974

[54] QUICK CHANGE SLIDING SINKER

[76] Inventor: Richard J. Fleischaker, 64 W. Iowa, St. Paul, Minn. 55117

[22] Filed: June 8, 1973

[21] Appl. No.: 368,346

[52] U.S. Cl. ............................................... 43/44.9
[51] Int. Cl. ............................................. A01k 95/00
[58] Field of Search ........ 43/44.9, 43.1, 44.87, 17.2

[56] References Cited
UNITED STATES PATENTS

| | | | |
|---|---|---|---|
| 1,848,600 | 3/1932 | Best | 43/43.1 |
| 2,393,070 | 1/1946 | Saloun | 43/44.91 |
| 2,741,067 | 4/1956 | Cox | 43/44.9 |

FOREIGN PATENTS OR APPLICATIONS

| | | | |
|---|---|---|---|
| 657,037 | 2/1963 | Canada | 43/17.2 |
| 1,564,556 | 3/1969 | France | 43/44.9 |

Primary Examiner—Robert Peshock
Assistant Examiner—Daniel J. Leach
Attorney, Agent, or Firm—James V. Harmon

[57] ABSTRACT

A quick change sliding sinker is provided having a top and bottom end. A slide hole extends through the sinker body from one side of the sinker to the other and is located closer to the top end of the sinker than the bottom end. A fishing line entry slot is provided in the sinker. One end of the slot connects with the hole and the other end extends through one side margin of the sinker at a point located closer to the bottom end of the sinker than the hole. A line retaining means such as a rubber O-ring is provided on the side of the body of the sinker between the hole and the other end of the slot to encircle the body of the sinker and cover the slot on each side, thereby preventing the line from falling out of the hole.

7 Claims, 7 Drawing Figures

PATENTED APR 2 1974 3,800,459

QUICK CHANGE SLIDING SINKER

THE PRIOR ART

The benefits provided sliding sinkers, i.e., sinkers that are free to slide up and down on the fishing line, are well known. They are less likely to become entangled in debris such as stumps, sticks, rocks etc. located on the bottom since they are free to slide on the line and in bouncing across the bottom give an action to the lure. They consist normally of an enlongated sinker with a hole through one end. The problem with these sinkers is that it is necessary to cut the line to remove them when changing from one lure to another. This is inconvenient, time consuming and wastes line. It is well known that a swivel is needed to keep the line from twisting. The swivel, of course, has to be removed to put on a new plug and it is when the swivel is removed that the line has to be cut to remove and replace the sliding sinker on the line with the new plug.

OBJECTS OF THE INVENTION

One object of the present invention is to provide an improved sliding sinker of the type described which can be quickly released and replaced on the line without cutting the line.

Another object is to provide an improved sinker of the type described that will slide freely on the line from a hole or opening at one end through which the line passes and includes a provision for sliding the line through a slot located on one marginal edge of the sinker.

A further object of the invention is the provision of an improved sliding sinker of the type described which is low cost and rugged in construction.

A further object is the provision of an improved sinker of the type described which is easily assembled and well adapted to mass production manufacture.

A further object is the provision of an improved sliding sinker as described which is resistant to wear and damage during use.

A further object is the provision of an improved sinker of the type described which will move through the water without creating a great deal of turbulance through the elimination of projecting metal parts such as detents etc.

A further object is the provision of a removable line retaining element which completely encircles the sinker and prevents removal of the line from either side of the sinker body.

THE FIGURES

SUMMARY OF THE INVENTION

A quick change sliding sinker is provided having a top and bottom end. A slide hole extends through the sinker body from one side of the sinker to the other and is located closer to the top end of the sinker than the bottom end. A fishing line entry slot is provided in the sinker. One end of the slot connects with the hole and the other extends through a margin of the sinker at a point located closer to the bottom end of the sinker than the hole. A line retaining means such as a rubber O-ring is provided on the side of the body of the sinker between the hole and the other end of the slot to encircle the body of the sinker and cover the slot on each side thereby preventing the line from falling out of the hole.

DESCRIPTION OF THE PREFERRED EMBODIMENTS

Figure 1:
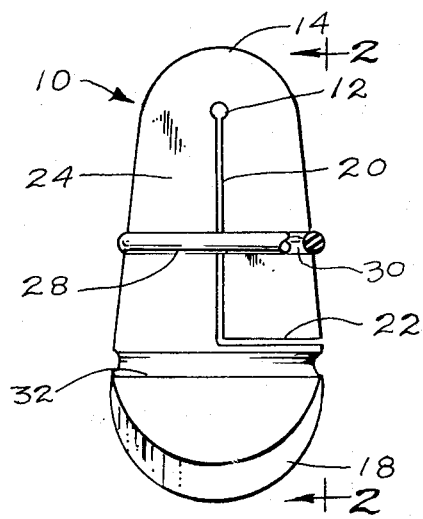
FIG. 1 is a side elevational view of the invention.
Figure 2:
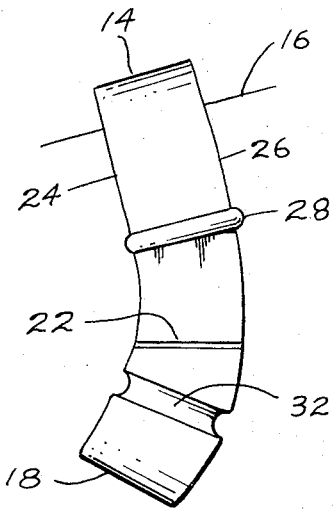
FIG. 2 is an elevational view taken on line 2—2 of FIG. 1.

Referring now to FIGS. 1 and 2, it will be seen that the sinker designated generally 10 is formed from a heavy material usually lead and is provided with a slide hole 12 near the top end 14 through which line 16 passes when the sinker is being used. Between the hole 12 and the bottom end 18 of the sinker is an elongated line entry slot 20 through which the line 16 is introduced into the hole 12. It will be noted that one end of the slot 20 terminates at the hole 12 and the other end designated 22 reaches the side margin of the sinker and it is through this opening that the line is introduced when it is to be placed into the hole. Slot 20 extends all the way from the front surface 24 of the sinker to the rear surface 26. Between the end 22 communicating with the side margin of the sinker and the end connected to the hole is a line retaining means 28 which in this instance consists of a rubber O-ring of a small size, for example three-eighths inch in diameter which is removably fastened to the sinker within a circular depression or groove 30 that extends entirely around the sinker generally at right angles to the direction of the long axis of the slot 20. In this way the O-ring 28 can be removed by sliding it downwardly or upwardly, for example into a second groove 32 parallel to groove 30 leaving the slot 20 unobstructed so that the line 16 can be introduced into the opening 12. The O-ring is then returned to the groove 30. This securely retains the line 16 at the desired position in the hole 12. The line retainer 28 need not be rubber provided it is able to move to a position allowing line 16 to be introduced from end 22 of the slot to the hole 12.

Figure 3:
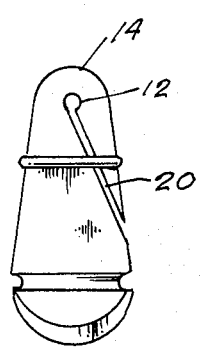
FIG. 3 is an elevation of a modified form of the invention.

Refer now to FIG. 3 which shows a modified form of the invention in which the same numerals designate corresponding parts. As seen in the figure, the slot unlike that in FIGS. 1 and 2 is slanted at an oblique angle relative to the longitudinal axis of the sinker and defines a straight line rather than having a right angle bend as illustrated in FIGS. 1 and 2 but is otherwise similar to the embodiment already described.

Figure 4:
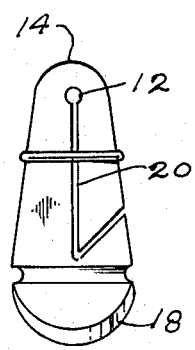
FIG. 4 is an elevational view of another modified form of the invention.
Figure 5:
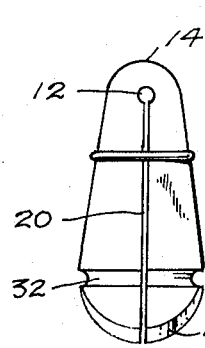
FIG. 5 is a view of still another modified form of the invention.

In the embodiment of FIG. 4, slot 20 extends downwardly somewhat further from the opening toward the opposite end 18 of the sinker but at that point extends upwardly on an inclined axis relative to the longitudinal axis of the sinker so as to make a sharp oblique angle with respect to the vertical portion of the slot. This makes it more difficult to lose the sinker even in the event the O-ring 28 is lost for some reason and gives the sinker more structural strength since the portion thereof to the right of the slot as seen in the figure cannot be bent outwardly owing to the engagement of the adjacent section of the sinker. As seen in FIG. 5, the slot 20 extends from the opening 12 all the way to the opposite end of the sinker and has no bend in it at all. This form of the invention is somewhat weaker structurally than that of FIG. 4 but can in some instances be manufactured more easily.

Figure 6:
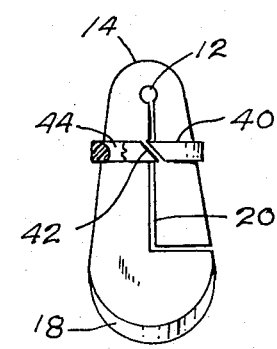
FIG. 6 is a view of yet another form of the invention.

Referring now to FIG. 6, which is otherwise similar to FIGS. 1 and 2, it will be seen that the O-ring has been replaced by a rigid plastic retaining ring 40 which is provided with a single diagonally oriented slot 42 extending entirely therethrough. The ring 40 is circular in configuration and is positioned within a circular groove 44 within the sinker. This enables the ring 40 to be rotated about its own center. To insert the line 16, it is introduced into the lower end of the slot 20 and elevated to the ring 40. A portion thereof is then passed through the slot 42. The ring 40 is then rotated on its axis 180° and the opposite side of the line 16 is passed through slot 42 allowing the whole line to enter into the opening 12.

It should be noted that in the present invention the line 12 does not extend longitudinally of the sinker but instead extends transversely therethrough from one face thereof to the other and the opening 12 is relatively short compared with the overall length of the sinker. This distinguishes the invention from the type of sinker which is elongated and in which the line itself extends along the length of the sinker. However, the sinker in accordance with the present invention need not necessarily be elongated, i.e., have one major axis thereof longer than the other.

Figure 7:
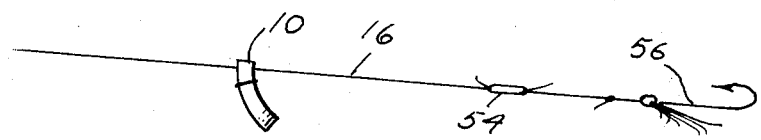
FIG. 7 is a persective view showing the sinker as it appears during use.

FIG. 7 illustrates the manner in which the sinker is used when it is attached to the line. The sinker 10 is mounted on the portion 16 of the line which extends to the fishing pole. A swivel 54 is connected to the lower end of line 16 and this is in turn connected to the fishing lure 56.

It will, of course, be understood that various details of construction may be varied through a wide range without departing from the principles of this invention and it is therefore not the purpose to limit the patent granted hereon otherwise then necessistated by the scope of the appended claims.

What is claimed is:

1. A quick change sliding sinker a top end and a bottom end, a slide hole extending through the body of the sinker from one side thereof to the other, the slide hole being located closer to the top of the sinker than the bottom end, a line entry slot in the sinker for introducing a fishing line therethrough into the slide hole, said slot having one end connected with the hole and the other end thereof extending through the margin of the sinker at a point locate closer to the bottom end of the sinker than the hole and a movable line retaining element on the side of the body of the sinker and located between said point and the hole, said line retaining means encircling the body of the sinker and covering the slot on each side of the body of the sinker to prevent the line from falling out of the hole and said line retaining means being movable to a position for releasing the line whereby the line can be moved from the hole through the slot to the point where the slot terminates at the margin of the sinker.

2. The sinker of claim 1 wherein the movable line retaining means comprises a rubber O-ring encircling the body of the sinker generally at right angles to the axis of the slot adjacent thereto.

3. The sinker of claim 1 wherein the sinker is elongated, the slot extends longitudinally of the sinker along the long axis thereof throughout a substantial part of its length thence laterally to the side margin of the sinker.

4. The sinker of claim 1 wherein the movable line retaining means is an elastic rubber O-ring, a groove is provided within the body of the sinker extending entirely around the body thereof between said point and the slide hole for the line, said groove being adapted to releasably retain the rubber O-ring in the desired position on the body of the sinker.

5. The sinker of claim 4 wherein a second groove is provided on the opposite side of said point from the hole to hold the rubber O-ring temporarily while the line is being introduced or withdrawn from the hole through the slot.

6. The sinker of claim 1 wherein the movable line retaining means comprises a rigid plastic retaining ring extending around the body of the sinker and rotatably mounted thereon for rotation upon its own central axis, a circular recess is provided in the body of the sinker to receive the plastic ring, said plastic ring is provided with a slot extending therethrough on one side thereof whereby the line can be passed through the slot on the ring first on one side whereupon the ring can be rotated 180° to pass another portion of the line through the slot thereby allowing the line to be moved into and out of the slide hole without cutting the line.

7. A quick change sliding sinker having an elongated body with a longitudinal axis thereof extending from the top of the sinker at one end to the bottom of the sinker at the other, a slide hole near the top end of the sinker extending through the body of the sinker from one side thereof to the other, a line entry slot in the sinker for introducing and removing a fishing line from the side hole, said slot having one end thereof communicating with the slide hole and the other end thereof extending through the margin of the sinker at a point located closer to the bottom end of the sinker than the hole, a pair of longitudinally spaced apart grooves around the body of the sinker each being located in a plane generally perpendicular to the longitudinal axis of the sinker, the first of said grooves being located between said point and the hole and the second of said grooves being located on the opposite side of said point from the hole and an elastic line retaining ring mounted within one of the grooves and adapted to be moved therefrom back and forth to the other groove for releasing the line and securing the line position within the slide hole.

* * * * *